March 31, 1964     R. F. KOEN     3,127,202
PRESTRESSED SHAFT ENGAGING UNIT

Filed May 7, 1962     2 Sheets-Sheet 1

*Richard F. Koen* INVENTOR.

March 31, 1964     R. F. KOEN     3,127,202
PRESTRESSED SHAFT ENGAGING UNIT
Filed May 7, 1962     2 Sheets-Sheet 2

Richard F. Koen INVENTOR.

BY

United States Patent Office 3,127,202
Patented Mar. 31, 1964

3,127,202
PRESTRESSED SHAFT ENGAGING UNIT
Richard F. Koen, 127 Ridgefield Road, Lutherville, Md.
Filed May 7, 1962, Ser. No. 193,363
1 Claim. (Cl. 287—52)

The present invention relates to a device incorporating an improved combination prestressed shaft gripping portion of element and a power take-off portion of element and is a continuation in part of my prior patent application Serial No. 848,747 filed October 26, 1959; it matured into Patent No. 3,042,433. The present device is particularly desirable for attaching pulleys, gears, rotary cutters, knives, etc. without the use of shaft keyways, and in some instances the power take-off element may have incorporated therein the gear or pulley, or other driving means.

The primary object of the invention is to provide such a device that is simple to manufacture and efficient in its operation.

Another object of the invention is to provide a shaft gripping element that may be applied to the shaft without any impressions being formed on the surface of the shaft.

A further object of the invention is to provide a device of this type that will have a minimum of parts and therefore will be less affected by vibration.

While several objects of the invention have been pointed out, other objects, uses and advantages may appear to one skilled in the art as the nature of the invention is more fully disclosed, as shown in the accompanying drawings and specifically described in the specifications to follow.

In the drawings.

In reference to the drawings like numerals are used to designate like and similar parts throughout the several views.

Figure 1:
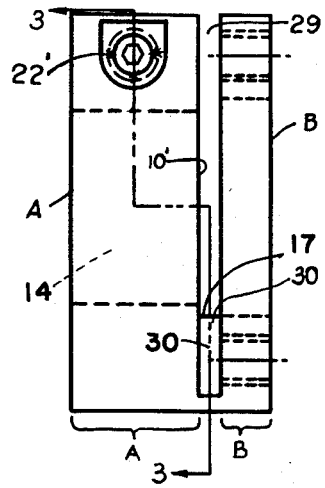
FIGURE 1 is a side elevation of the device.

Referring in particular to FIGURE 1 the unit comprises a combination gripping element A and power take-off element B.

The gripping element A operates in substantially the same manner as the gripping element in my prior application for United States Letters Patent, Serial No. 848,747 filed October 26, 1959, that is, it consists of an annular ring formed preferably from a high resilient steel, or other suitable material, having an opening, or hole 14. The opening is formed by first boring a hole slightly smaller than the shaft upon which it is adapted to engage by the manner hereinafter described. The ring is split along a line parallel with a plane passing through the axis of the gripping element about which it is adapted to rotate, as shown at 15. This leaves two opposite transverse abutted faces 18 and 20.

In the ring and adjacent one of the faces is a threaded aperture 22. Receivable within the aperture, is a setscrew 24. The front end 24' of the screw is adapted to engage the face 20 opposite the face 18 containing the aperture, as is well shown in FIGURE 3. After the screw 24 is inserted into the threaded aperture the outer end of the threaded aperture 22 is staked at 22' to limit the backward movement of the screw.

If the power take-off element B is constructed integral with the gripping element A and from the same piece of stock, the aperture 22 is placed at one side of the piece of stock, as shown in FIGURE 1. Extending inwardly from the face of the power take-off element B is a slot 29 which is cut perpendicularly to the axis of the elements A and B, preferably beginning from the side of the ring containing the abutted ends to a point slightly beyond the opposite side of the shaft hole. This leaves an integral part 30 extending between the shaft gripping element A and the power take-off element B. While the power take-off element is shown as separated by the slot 29, the unit may be constructed with the power take-off element in direct contact with the side face 10' of the gripping element and secured thereto by welding the two elements together in a relatively small area similar to that shown at 30 for the integral formation of the elements or the two elements A and B may be fastened together by machine screws, bolts etc.

Figure 4:
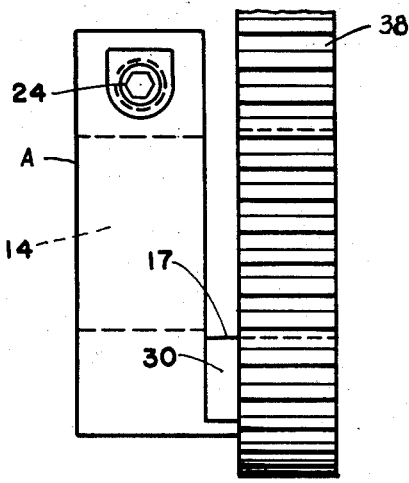
FIGURE 4 is a modified form of the device showing a gear wheel associated with the power take-off element.
Figure 5:
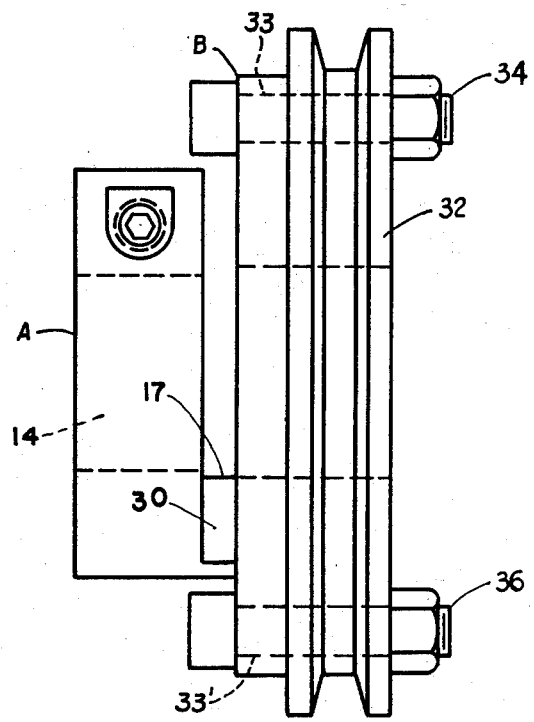
FIGURE 5 is a still further modified form of the device showing a V belt pulley associated with the power take-off element.

In FIGURE 4 there is illustrated a gear wheel 38 constructed with the power take-off element B. FIGURE 5 shows the power take-off element of a greater outside diameter than the outer diameter of the gripping element to enable a pulley 32 or the like to be attached thereto by screws or bolts 34 and 36.

Figure 2:
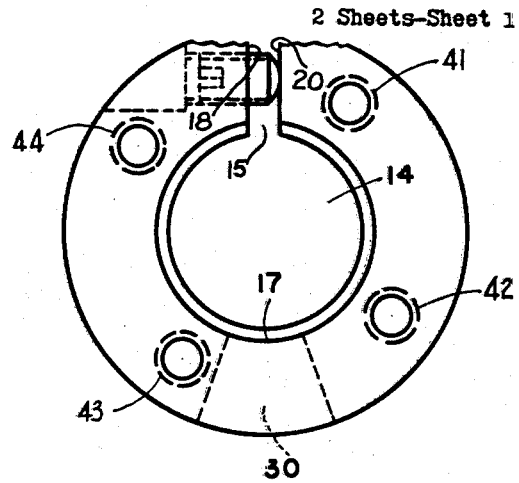
FIGURE 2 is an end elevation of the same.

In some instances, to facilitate construction of the unit it may be more convenient to continue the cross-slot 15 through the power take-off element B as shown in FIGURE 2. However, there would be no expansion of the power take-off element B as there is in the gripping element A, and therefore the pulley or gear may be fixedly secured to the element B in the same manner as it is when the element B is not cross-slotted.

Figure 3:
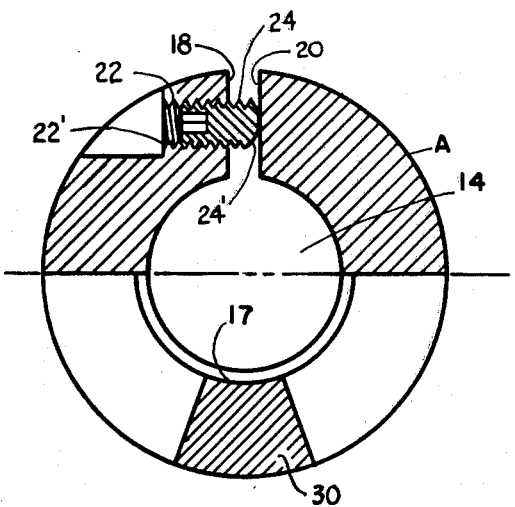
FIGURE 3 is a sectional view taken on line 3—3 of FIGURE 1.

There are several procedures in manufacturing the unit. One way would be to provide a piece of suitable steel stock of sufficient size and length to construct the gripping element and the power take-off element as an integral unit. First the initial hole 14 is bored through the center of the stock including both element A and element B slightly smaller than the shaft over which the unit is adapted to be used. However, the initial hole is not the final boring of the gripping element as will appear later. Next, the transverse slot is cut in one side of the ring either through element A or both element A and B, as shown in FIGURES 2 and 3 at 15. In one face and centrally of the gripping element A, the threaded aperture 22 is provided into which the set screw 24 is threadably receivable, the forward end 24' of the screw 24 being adapted to engage the opposite face 20 of the gripping element. The unit is next slotted as shown at 29 to separate the gripping element A from the power take off element B, as shown in FIGURE 1, preferably beginning in the area of the cross-slot 15 and extended to a point slightly beyond the opposite side of the hole for the shaft, as shown at 17. The cut is stopped at this point leaving a portion 30 integral with both elements A and B. After the unit has been thus formed, the screw 24 in the gripping element A is extended inwardly engaging the face 20, moving the faces 18 and 20 apart enlarging the hole 14 to a predetermined size just under the size of the shaft, after which the hole 14 in the gripping element A and the power take-off element B are rebored to the size to allow the unit to be easily slipped over the shaft. It will be seen that the reboring of the unit will give clearance for the element B to slip over the shaft along with the expanded gripping element A. If the power take-off element B is not formed to transmit its power directly, such as, in the form of a gear or pulley etc. it may be provided with tapped holes 41, 42, 43 and 44, as shown in FIGURES 1 and 2 for the purpose of receiving screws for attaching a pulley or like element. The periphery of the power take off element B may be extended past the periphery of the gripping element A as shown at 32 in FIGURE 5 and having drilled holes 33 and 33' for the purpose of receiving bolts 34 and 36 for attaching a pulley 32 or like element. In attaching the unit to the shaft, the unit is slipped over the shaft and the set screw 24 is backed off, allowing the gripping element to contract and grip the shaft. The outer end 22' of the aperture 22 being staked, will not allow the screw to be moved back any further than the outer rim of the aperture 22, but sufficient to allow the full contracting force of the elastic ring to engage the shaft.

This type unit has extremely high holding power, in fact, it holds far better than the generally used set screw. At the same time there is no marring of the shaft, and any kind of adjustments may be made relative to the shaft, which is particularly helpful in automatic machines for setting timing of gears, cams etc.

While the invention shown and described is a specific type of unit, it is not intended as a limitation as the scope of the invention is best defined in the appended claim.

I claim:

A combination prestressed shaft gripping element and power take-off element comprising:

(a) a shaft gripping element having a concentric outer circumference and a circular hole through the center thereof slightly smaller than the diameter of the shaft and having a radial slot forming two opposing axially extending faces, (b) means for moving the faces apart under stress for increasing the diameter of the said gripping element to a size to extend over the shaft, whereby the tendency of the gripping element to return to its original diameter will grip the shaft when the expanding means is released, (c) a power take-off element having a concentric outer circumference and a central circular hole of slightly greatere diameter than the hole in the gripping element and adapted to slip snugly over the shaft without expanding the same, (d) the shaft gripping element and the power take-off element having the same rotating axis and having their sides positioned adjacent each other, the gripping element and power take-off element being integrally joined in a relatively small area of their adjacent sides at a spot which is diametrically opposite from said radial slot and entirely below said central circular hole, thereby leaving the remaining adjacent sides of the two elements unconnected.

References Cited in the file of this patent

UNITED STATES PATENTS

| | | |
|---|---|---|
| 669,927 | Hoffman | Mar. 12, 1901 |
| 2,395,169 | Crane et al. | Feb. 19, 1946 |
| 2,467,819 | Firth | Apr. 19, 1949 |
| 2,804,322 | Herzog | Aug. 27, 1957 |
| 3,042,433 | Koen | July 3, 1962 |
| 3,081,099 | Walker et al. | Mar. 12, 1963 |